(12) United States Patent
Adachi et al.

(10) Patent No.: US 9,195,744 B2
(45) Date of Patent: Nov. 24, 2015

(54) PROTECTING INFORMATION IN SEARCH QUERIES

(75) Inventors: Noritaka Adachi, Kanagawa-ken (JP);
Shingo Kato, Kanagawa-ken (JP);
Shinya Kawanaka, Kanagawa-ken (JP);
Raymond Harry Putra Rudy, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1128 days.

(21) Appl. No.: 12/506,109

(22) Filed: Jul. 20, 2009

(65) Prior Publication Data
US 2010/0023509 A1    Jan. 28, 2010

(30) Foreign Application Priority Data

Jul. 25, 2008    (JP) ................... 2008-192799

(51) Int. Cl.
*G06F 17/30* (2006.01)
(52) U.S. Cl.
CPC .... *G06F 17/30864* (2013.01); *G06F 17/30448* (2013.01); *G06F 17/30451* (2013.01); *G06F 17/30507* (2013.01)
(58) Field of Classification Search
None
See application file for complete search history.

(56) References Cited

U.S. PATENT DOCUMENTS

| 5,590,319 | A  | * | 12/1996 | Cohen et al. ...................... | 1/1 |
| 7,437,349 | B2 | * | 10/2008 | Basu et al. ...................... | 1/1 |
| 7,984,039 | B2 | * | 7/2011  | Carmel et al. ................ | 707/713 |
| 7,984,043 | B1 | * | 7/2011  | Waas ............................ | 707/718 |
| 2002/0174115 | A1 | * | 11/2002 | shibuya et al. .................... | 707/3 |
| 2003/0014405 | A1 | * | 1/2003 | Shapiro et al. .................... | 707/5 |
| 2003/0023607 | A1 | * | 1/2003 | Phelan et al. ................. | 707/100 |
| 2003/0074352 | A1 | * | 4/2003 | Raboczi et al. ................... | 707/4 |
| 2003/0233401 | A1 | * | 12/2003 | Dean ............................ | 709/202 |
| 2005/0149520 | A1 | * | 7/2005 | De Vries .......................... | 707/5 |
| 2006/0047649 | A1 | * | 3/2006 | Liang ............................. | 707/4 |
| 2007/0016574 | A1 | * | 1/2007 | Carmel et al. ..................... | 707/5 |
| 2008/0033920 | A1 | * | 2/2008 | Colclasure et al. .............. | 707/3 |
| 2008/0243827 | A1 | * | 10/2008 | Sarma et al. ..................... | 707/5 |

(Continued)

FOREIGN PATENT DOCUMENTS

| JP | 07-146878 A | 6/1995 |
| JP | 09-120402 A | 5/1997 |

(Continued)

OTHER PUBLICATIONS

Gasarch, William; "A Survey on Private Information Retrieval"; http://www.cs.umd.edu/~gasarch/papers/pirsurvey.pdf; University of Maryland; United States.

(Continued)

*Primary Examiner* — Miranda Huang
(74) *Attorney, Agent, or Firm* — Steven L. Nichols; Van Cott, Bagley, Cornwall & McCarthy P.C.

(57) ABSTRACT

A method of protecting information in search queries uses a search apparatus with a user interface that is configured for connection to a computer network that comprises a plurality of search engines on a plurality of servers. The method includes receiving a search query comprising a plurality of keywords; dividing the search query into a number of sub-queries, each sub-query comprising at least one of the keywords; and submitting the sub-queries to different search engines.

23 Claims, 8 Drawing Sheets

(56) References Cited

U.S. PATENT DOCUMENTS

2010/0153107 A1* 6/2010 Kawai ........................... 704/240
2011/0161176 A1* 6/2011 Ai ............................... 705/14.66

FOREIGN PATENT DOCUMENTS

| JP | 11-045274 A | 2/1999 |
|----|-------------|--------|
| JP | 11-259512 | 9/1999 |
| JP | 2001-125923 A | 5/2001 |
| JP | 2002-297606 | 10/2002 |
| JP | 2002-351908 A | 12/2002 |
| JP | 2006-313558 A | 11/2006 |
| JP | 2007-034874 A | 2/2007 |

OTHER PUBLICATIONS

"Private Stream Searching Toolkit," Advanced Crypto Software Collection, http://acsc.csl.sri.com/privss/.

Shiobara, Tatsuya, JBiC Bio DB System, FUJITSU, Fujitsu Limited, Sep. 20, 2002, vol. 53, No. 5, p. 359-365; English Abstract Only.

* cited by examiner

|   |   |   |   |   | CO-OCCURRENCE PROBABILITY |
|---|---|---|---|---|---|
| ○ | SEARCH | PLURAL | SERVER |  | 0.68 |
| × | PLURAL | SERVER | INQUIRY |  | 0.52 |
| ○ | PRIVATE | SERVER | INQUIRY |  | 0.48 |
| ○ | SEARCH | QUERY | SERVER |  | 0.34 |
| × | SEARCH | QUERY | PLURAL | INQUIRY | 0.25 |
| × | SEARCH | PRIVATE | SERVER | INQUIRY | 0.21 |

PROTECTING INFORMATION IN SEARCH QUERIES

BACKGROUND

At present, various search engines for searching Web pages are public on the Internet and are available to anyone. However, if private information, such as patent information, information on the development of new products, know-how, personal information, etc., is searched or retrieved using a public search engine, the private information may be surmised from keywords included in the search query.

BRIEF SUMMARY

A method of protecting information in search queries uses a search apparatus with a user interface that is configured for connection to a computer network that comprises a plurality of search engines on a plurality of servers. The method includes receiving a search query comprising a plurality of keywords; dividing the search query into a number of sub-queries, each sub-query comprising at least one of the keywords; and submitting the sub-queries to different search engines A search apparatus that is implemented in a computer includes a processor programmed to: receive a search query comprising a plurality of keywords; divide the search query into a number of sub-queries, each sub-query comprising at least one of the keywords; and submit the sub-queries to different search engines A computer program product for protecting information in search queries includes a computer readable storage medium having computer readable program code embodied therewith, the computer readable program code comprising: computer readable program code configured to receive a search query comprising a plurality of keywords; computer readable program code configured to divide the search query into a number of sub-queries, each sub-query comprising at least one of the keywords; and computer readable program code configured to submit the sub-queries to different search engines.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

The present specification discloses a search apparatus, search method, and search program which execute a search using a public search engine and can efficiently acquire necessary information without allowing private information to be surmised.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

As indicated above, at present, various search engines for searching Web pages are public on the Internet and are available to anyone. However, information which the user may wish to keep private might possible be surmised from the keywords or search criteria used to conduct the search.

As a solution to such a problem, Japanese Patent Application Publication No. 11-259512 (Patent Document 1) discloses a search system which executes a search using all or a part of search conditions, input to a data search apparatus, as confidential information concealed from or incomprehensible to the data search apparatus, and allows the data search apparatus to narrow the search results. To make the search conditions concealed or incomprehensible, the system deletes pre-registered search conditions to be concealed from all the search conditions input, replaces the input search conditions with similar words or broader words, and adds an extra search condition to the input search conditions or separates the input search conditions into a plurality of search languages. However, because the system modifies search conditions in this manner, the system may produce less useful search results and be unable to acquire the information needed, or may acquire a large amount of irrelevant information.

Japanese Patent Application Publication No. 2002-297606 (Patent Document 2) discloses a database access system which can use an information providing service while concealing search conditions desired to be confidential by a user. A client computer sends an encrypted inquiry in which data items to be confidential included in search conditions are encrypted to a server computer, which searches data through encryption data matching without decrypting the encrypted search conditions and while encrypting data to be retrieved in a manner similar to the one employed for the confidential data items. However, the encryption performed by the system merely makes methods of combining search conditions (AND, OR, NOT, etc.) confidential. There also arises a problem that processing loads of the encryption and data matching become greater.

In addition to the foregoing approaches, the following search methods are proposed.

Private Information Retrieval (PIR): In this method, while a server has N-bit data, a client acquires one bit in N bits without informing the server. A simple solution to this issue is that the server sends all N bits to a client. However, there have been study results showing that the problem can be solved without sending all the bits on the assumption of the presence of a plurality of servers and the complexity of computation since 1990s. Those are mathematical basic theories and have not been put to a practical use. (See http://www.cs.umd.edu/~gasarch/papers/pirsurvey.pdf (Non-patent Document 1).)

[Oblivious Transfer (OT)]

While a client may acquire information other than information desired by the client in case of PIR, a protocol which satisfies PIR but does not allow a client to acquire other than information desired by the client is designed in setting OT. In the case of OT, there is no limitation to the communication traffic. OT is the same as Symmetric PIR which appears in Non-patent Document 1. Those are also theories and hardly see practical applications.

[New Techniques for Private Stream Searching]

This scheme can provide search results without making information public to a server by allowing the server to encrypt a query with a user's public key and encrypt an index too at the same time. This scheme however requires the technique installed in the server, and disables the use of a generally used search engine. (See http://acsc.csl.sri.com/privss/ (Non-patent Document 2).)

A search apparatus according to the principles described herein comprises main query input means that accepts an input of a main query including a plurality of keywords, sub query generating means that generates a plurality of sub queries each including one or more keywords by combining the keywords included in the main query input by the main query input means, search request means that separately sends the plurality of sub queries generated by the sub query generating means to the search engine, compilation means that compile and sort a plurality of search results returned from the search engine in response to the plurality of sub queries sent from the search request means, with the main query input by the main query input means, and search result display means that displays search results acquired by the re-search means.

In more detail, a search apparatus according to principles described herein generates a plurality of sub queries by combining keywords included in a main query input by the user.

The search apparatus then separately sends the sub queries to a number of different search engines, thus making it possible to efficiently acquire necessary information without allowing anyone to surmise private information from the main query. The search apparatus may be a computer, server or other programmable processing system. The various functions of the search apparatus may be performed by individual "means," described below, that may be embodied as hardware or software modules within any such system.

With the search apparatus, a sub query generating means includes keyword combining means that generate a plurality of combinations each including one or more keywords, and sub query excluding means that exclude, from the sub queries, a combination among the plurality of combinations generated by the keyword combining means which makes it easy to guess private information. In various embodiments, the sub query excluding means include means for accepting an input of a combination of keywords to be inhibited, and means for excluding the input combination. In various embodiments, the sub query excluding means include means for excluding a designated combination. In various embodiments, the sub query excluding means include means for excluding a combination including an unknown keyword. In various embodiments, the sub query excluding means include means for acquiring co-occurrence probabilities of keywords included in each combination generated by the keyword combining means, and means for excluding a combination whose co-occurrence probability acquired is lower than a predetermined value.

The present invention also provides a search method and search program which are executed by the above-described search apparatus.

An embodiment of the present invention will be described in detail below by referring to the accompanying drawings. To avoid the redundant description, like or same reference numerals are given to those components which are the same as or equivalent to the corresponding components.

Figure 1:
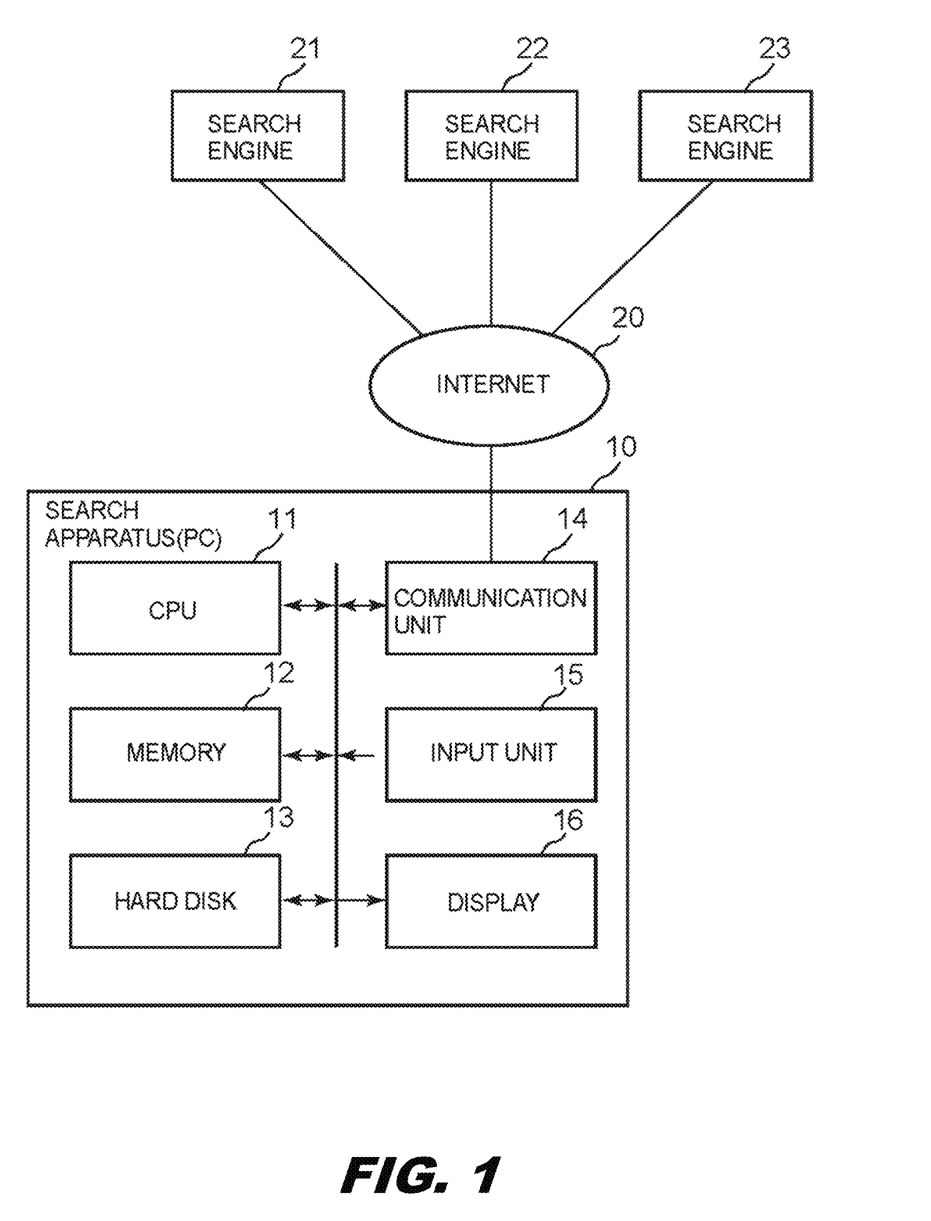
FIG. 1 is a functional block diagram showing the configuration of a search apparatus according to one exemplary embodiment of principles described herein.

Referring to FIG. 1, a search apparatus 10 according to an embodiment of the present invention includes a CPU (Central Processing Unit) 11, a memory 12, a hard disk 13, a communication unit 14, an input unit 15, and a display 16. The communication unit 14 connects the search apparatus 10 to an Internet 20, sends various requests to search engines 21 to 23, and receives various responses from the search engines 21 to 23. The input unit 15 is a keyboard, a mouse or any other device for receiving user input. The search apparatus 10 may be a computer, laptop, server or other computerized system programmed, as explained herein, to receive a search query comprising a plurality of keywords; divide the search query into a number of sub-queries, each sub-query comprising at least one of the keywords; and submit the sub-queries to different search engines. Alternatively, the search apparatus 10 may be constructed as a search program to be discussed later, that is configured to be installed in a personal computer (PC) or the like. The search program may be provided in the form of computer-readable instructions being fixedly stored in a storage medium, such as CD-ROM, or is downloaded from a server over the Internet 20.

Various business proprietors construct the search engines 21 to 23 on World Wide Web (WWW) servers connected to the Internet 20 to provide the public with a Web site search service. The search engines 21 to 23 return search results in response to search requests (queries) from unspecified multiple clients connected to the Internet 20. The search apparatus 10, as one such client, executes a search using such the public search engines 21 to 23.

Figure 2:
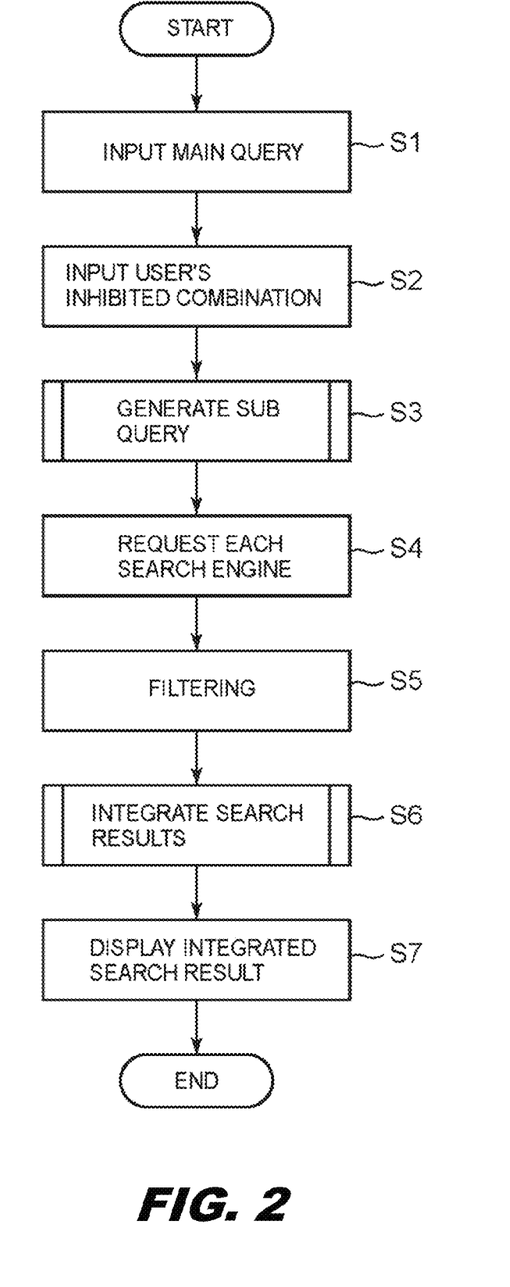
FIG. 2 is a flowchart illustrating a search program in the search apparatus shown in FIG. 1, according to one exemplary embodiment of according to principles described herein.

The operation of the search apparatus 10 will be described below. The CPU 11 is a programmed processor that executes a search program as illustrated in FIG. 2. The search program may be stored on the hard disk 13 and loaded to memory 12 for execution by the processor 11 as needed.

Figure 3:
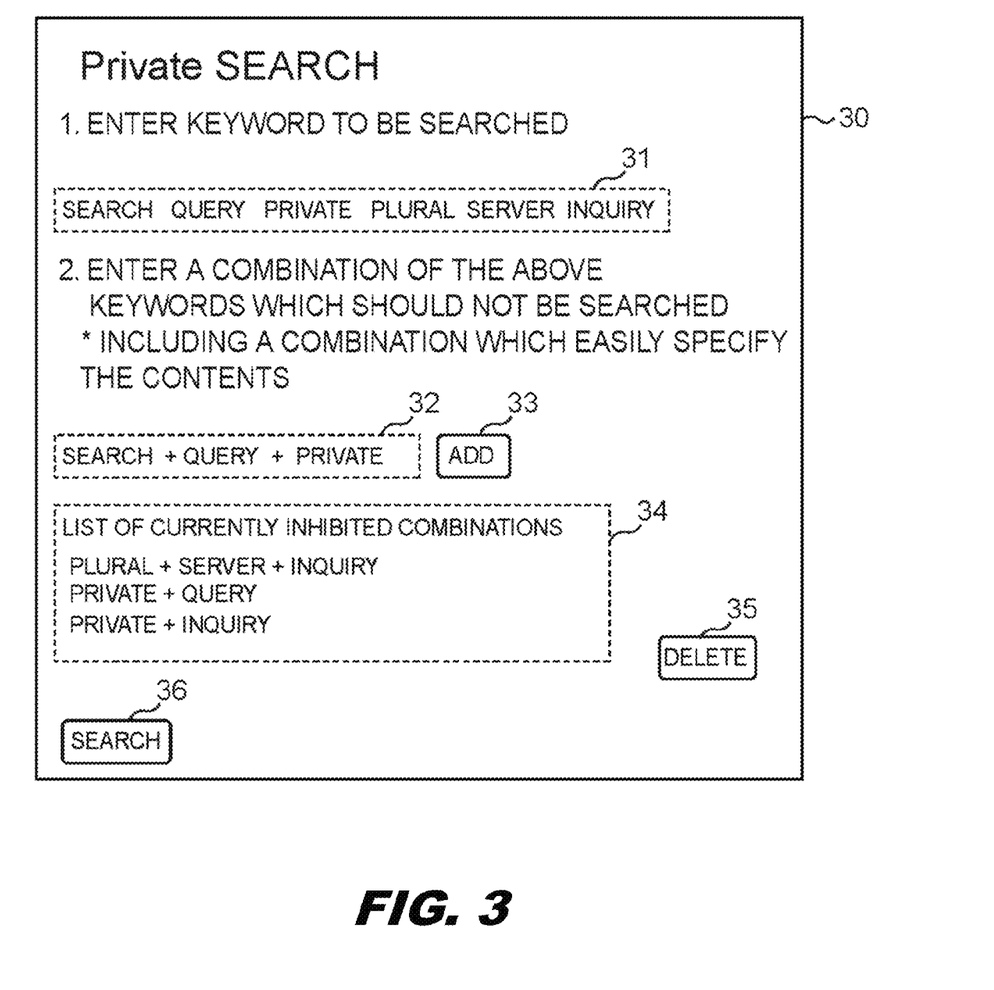
FIG. 3 is a diagram showing an input screen for a main query and a user's inhibited combination in FIG. 2, according to one exemplary embodiment of principles described herein.

Referring to FIG. 2, the search apparatus 10 accepts an input of a main query including a plurality of keywords (S1). Specifically, a screen 30 shown in FIG. 3 is displayed on the display 16. A user manipulates the input unit 15 on the screen to enter a plurality of keywords relating to information to be retrieved on a predetermined field 31 as a main query.

Subsequently, the search apparatus 10 accepts an input of a combination of keywords to be inhibited (S2). Specifically, the user manipulates the input unit 15 on the screen 30 shown in FIG. 3 to enter a combination of keywords which makes it easy to guess private information (hereinafter called "user's inhibited combination") in the predetermined field 32. When the users enters a desired user's inhibited combination and clicks an Add button 33, the input user's inhibited combination is added to a list, and saved in the memory 12 or the hard disk 13. The list of user's inhibited combinations is displayed in a predetermined field 34 on the screen 30 shown in FIG. 3. When the user selects a user's inhibited combination to be deleted from the list, and clicks a Delete button 35, the selected user's inhibited combination is deleted from the list.

Subsequently, the search apparatus 10 combines the keywords included in the main query input in step S1, and generates sub queries equal in number to the search engines (three in the embodiment) (S3). Each of the sub queries includes one or more keywords. The details will be given later.

When the user clicks a Search button 36 on the screen 30 shown in FIG. 3, the search apparatus 10 sends a plurality of sub queries generated in step S3 to a plurality of search engines 21 to 23, respectively, to request the search engines 21 to 23 to perform searching (S4).

Subsequently, the search apparatus 10 temporarily saves a plurality of search results, returned from a plurality of search engines 21 to 23 in response to the plurality of sub queries, in the memory 12 or the hard disk 13. Each of the search results includes data necessary to specify one or more Web pages hit (specifically, URL (Uniform Resource Locator) of a Web page, title, part of an extracted text, etc.; hereinafter called "hit page"). Then, the search apparatus 10 processes, e.g. filters, each search result with the main query to exclude a listing, e.g., an irrelevant hit page, that does not satisfy the search query, e.g., which would not be a hit if the main query were sent directly to the search engines 21 to 23 from each search result (S5). Then, the search apparatus 10 integrates a plurality of search results having irrelevant hit pages excluded therefrom (S6). The details will be given later.

Finally, the search apparatus 10 displays re-search results acquired through steps S5 and S6 on the display 16 (S7).

Figure 4:
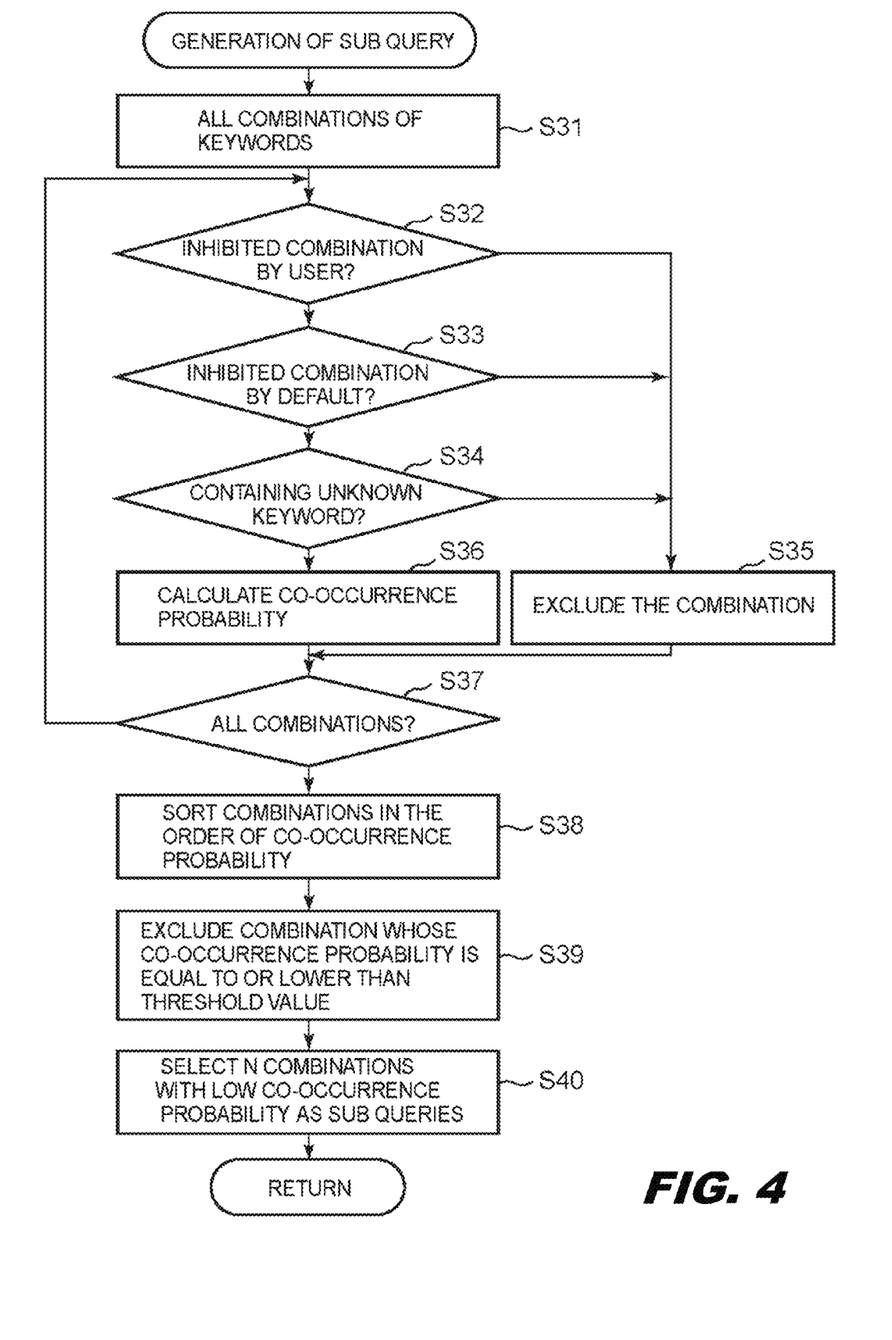
FIG. 4 is a flowchart illustrating a sub routine for sub query generation in FIG. 2, according to one exemplary embodiment of principles described herein.

Next, a sub routine for sub query generation in step S3 will be described referring to FIG. 4.

First, all of mathematical combinations of keywords are generated (S31). Each combination includes one or more keywords. Given that N is the number of keywords input in step S1, 2N−1 combinations are generated.

Then, each keyword combination generated in step S31 is compared with the user's inhibited combinations input in step S2 (S32). If it a combination matches any of the user's inhibited combinations (S32: YES), that combination is excluded from use as a sub query (S35).

Each keyword combination generated in step S31 is also compared with a default inhibited combination (S33). The default inhibited combination is designated by an administrator beforehand as a combination of keywords which makes it easy to guess private information. If the keyword combination matches the default inhibited combination (S33: YES), that combination is excluded from use as a sub query (S35).

It is determined whether each combination generated in step S31 contains an unknown keyword not located in a dictionary (S34). When there is an unknown keyword (S34: YES), private information is easy to be guessed from the unknown keyword, the combination including the unknown keyword is excluded for use as a sub query (S35).

Subsequently, the co-occurrence probabilities of keywords included in each combination generated in step S31 are calculated (S36). The co-occurrence probability is a ratio or percentage chance that two or more keywords will be used in the same document or Web site. The higher the co-occurrence probability is, the higher the generality is, so that there is a low probability that private information is guessed from the keyword combination. On the other hand, the lower the co-occurrence probability is, the lower the generality is, so that there is a high probability that private information is guessed from the keyword combination. The co-occurrence probability can be calculated by referring to, for example, a corpus having a vast amount of documents saved in a text form.

Figure 5:
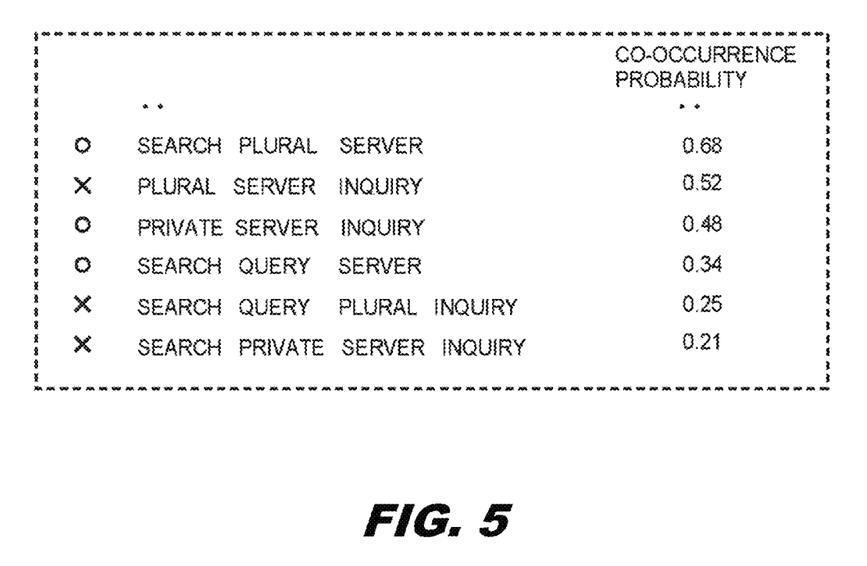
FIG. 5 is a list of combinations sorted in the order of co-occurrence probabilities in FIG. 4, according to one exemplary embodiment of principles described herein.

When the processes of the steps S32 to S36 are completed for every combination (S37: YES), keyword combinations are sorted in the descending order of co-occurrence probabilities calculated in step S36 from a higher one (S38). The sorted results are shown in FIG. 5. Then, keyword combinations whose co-occurrence probabilities are equal to or lower than a predetermined threshold value (0.25 in the embodiment) are excluded (S39) from use as a sub query.

Instead of the threshold value, the number of keyword combinations to be excluded may be set. When the combination number is set to "2", for example, two combinations with low co-occurrence probabilities are excluded from use as a sub query. The number of search results acquired by the search engine may be used as a co-occurrence probability. A small number of search results means that there are few documents in which two or more specific keywords appear together and the co-occurrence probability is low. On the other hand, a large number of search results means that there are many documents in which two or more specific keywords appear together and the co-occurrence probability is high. Referring to the history of search queries given to the search engines, the frequency of a combination of keywords which are used together may be used as a co-occurrence probability.

Of the combinations remaining as a result of the exclusion, n combinations are selected as sub queries in order from a lower co-occurrence probability (n being the same as the number of the search engines and n=3 in the embodiment) (S40).

In the example shown in FIG. 5, a combination of "plural", "server" and "inquiry" is excluded as a user's inhibited combination, a combination of "search", "query", "plural" and "inquiry" and a combination of "search", "private", "server" and "inquiry" are excluded as a co-occurrence probability of 0.25 or less. Then, of the remaining combinations, three combinations having higher co-occurrence probabilities (marked by O in FIG. 5) are selected as sub queries.

Next, referring to FIGS. 6 and 7, a subroutine for integration of search results in step S6 will be described.

Figure 7:
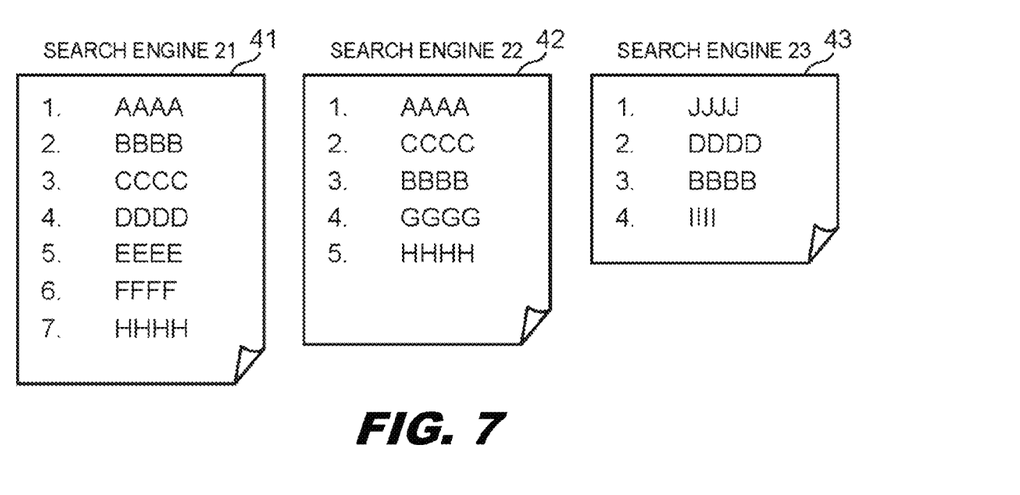
FIG. 7 is a diagram showing an example of a plurality of individual search results acquired from a plurality of search engines in FIG. 1, according to one exemplary embodiment of principles described herein.

FIG. 7 shows an example where a plurality of search results which are acquired from a plurality of search engines 21 to 23 and do not include an irrelevant hit page (hereinafter called "individual search results"). Each of individual search results 41 to 43 includes one or more hit pages and its ranking. Each of the search engines 21 to 23 generally ranks Web pages having a high relevancy to a given query according to particular rules.

At the time of generating a single search result by integrating the individual search results 41 to 43 (hereinafter called "integrated search result"), the following rules are applied. That is, in principle, hit pages are sorted in the order of the individual search results 41 to 43. Note that when the same hit page is included in two or more individual search results, the search result with the highest rank has a priority over the other. If there are individual search results having the same highest rank, the following rules are applied in order.

(1) A search engine with a priority in the search engines 21 to 23 is designated beforehand, and the rank of the individual search results acquired by the priority search engine are given priority.

(2) A hit page which has a larger number of individual search results containing the same hit page is given priority.

(3) An individual search result which has a larger number of hit pages is given priority.

Figure 6:
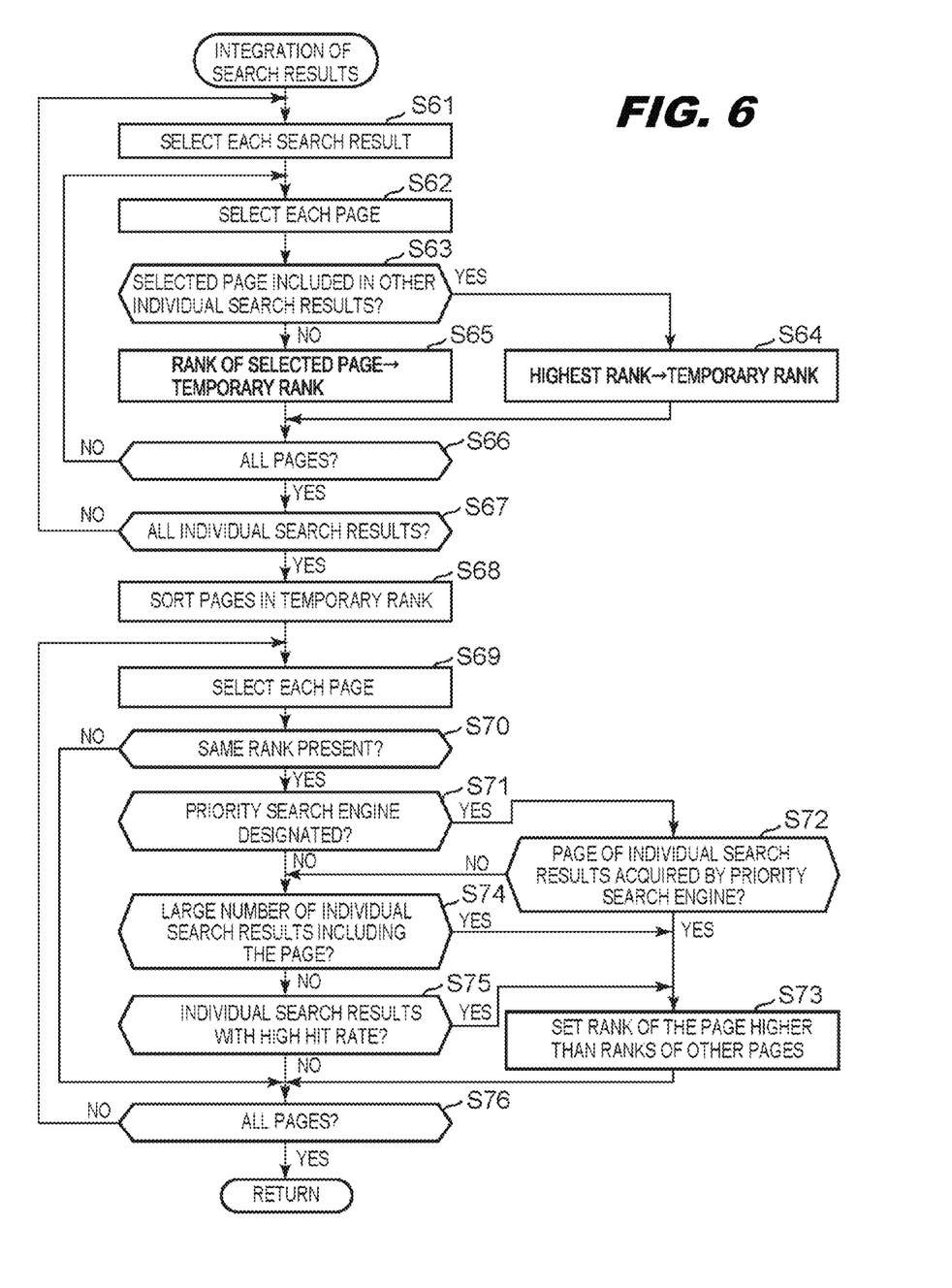
FIG. 6 is a flowchart illustrating a subroutine for search result integration in FIG. 2, according to one exemplary embodiment of principles described herein.

Referring to FIG. 6, the individual search results 41 to 43 are selected one by one in order (S61), and s in the selected individual search result are selected one by one in order (S62).

Subsequently, it is determined whether the selected hit page is included in another individual search result which is not selected (S63). When the selected hit page is included in another unselected individual search result (S63: YES), the top rank in the ranks of two or more individual search results including the hit page is set as a temporary rank (S64). When the selected hit page is not included in other individual search results (S63: NO), on the other hand, the rank of the hit page selected in the selected individual search results is set as a temporary rank (S65).

The processes of the steps S62 to S65 are repeated for every hit page (S66: NO), and the processes of the steps S61 to S66 are repeated for every individual search result (S67: NO). When the processes are completed for every individual search result (S67: YES), the hit pages are sorted in the set temporary rank (S68).

After the hit pages are sorted, the hit pages are selected one by one in order (S69). It is then determined whether there is another hit page having the same temporary rank as the rank of the selected hit page (S70). When there are a plurality of hit pages having the same temporary rank (S70: YES), the rules (1) to (3) are applied.

Specifically, with a priority search engine being designated beforehand (S71: YES), when the selected hit page is acquired by the priority search engine (S72: YES), the rank of the hit page is set higher than the ranks of the other hit pages (S73).

When a priority search engine is not designated beforehand (S71: NO) or when the selected hit page is not acquired by the priority search engine (S72: NO), the number of individual search results including the selected hit page is compared with the number of individual search results including hit pages having the same temporary rank as that of the selected hit page, and when the former number is larger than the latter number (S74: YES), the rank of the hit page is set higher than the ranks of the other hit pages (S73).

When the number of the individual search results including the selected hit page is less (S74: NO), the number of all hit pages of the individual search results including the selected hit page is compared with the number of individual search results including hit pages having the same temporary rank as that of the selected hit page, and when the former number is larger than the latter number (S75: YES), the rank of the hit page is set higher than the ranks of the other hit pages (S73).

The processes of the steps S69 to S75 are repeated for every hit page (S76: NO). As a consequence of the foregoing processes, a single integrated search result is generated.

Figure 8:
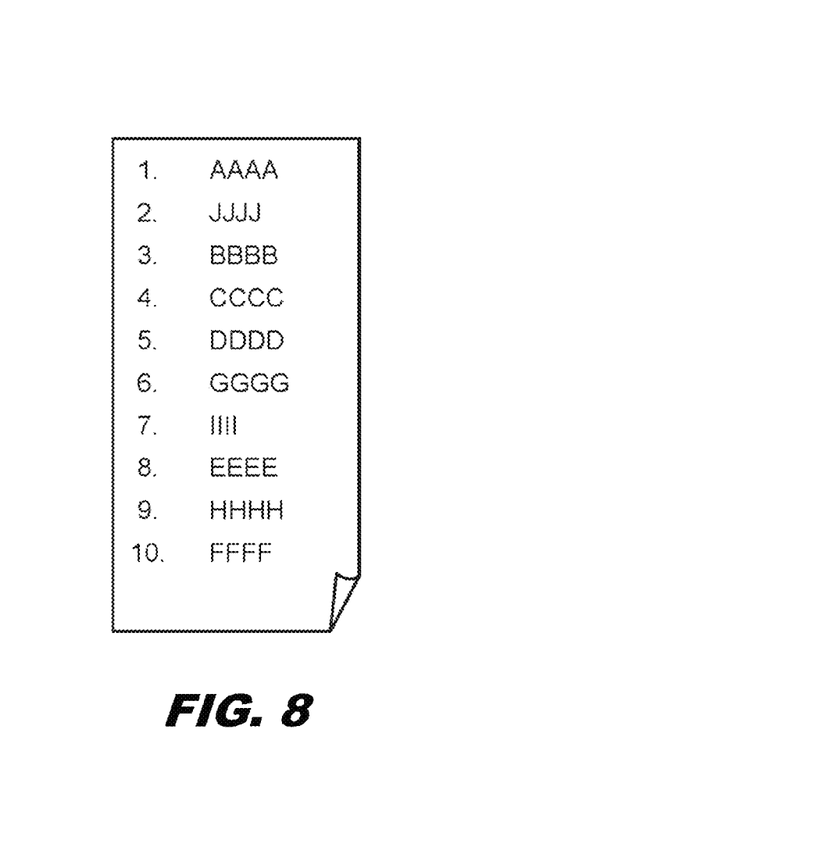
FIG. 8 is a diagram showing an example of an integrated individual search result generated in the search result integration in FIG. 2, according to one exemplary embodiment of principles described herein.

FIG. 8 shows an example of an integrated search result generated as a consequence of integrating the individual search results 41 to 43 shown in FIG. 7 when a priority search engine is not designated. In the example, because "AAAA" has a high rank in the two search engines 21, 22, "AAAA" has a higher rank than "JJJJ" according to the rule (2). Because the temporary ranks of "BBBB" in the individual search results 41 to 43 are respectively "second rank", "third rank" and "third rank", and the temporary ranks of "CCCC" in the individual search results 41 to 43 are respectively "third rank", "second rank", "no rank", "BBBB" has a higher rank than "CCCC" according to the rule (2). In addition, because the number of hits of the individual search result 42 including "GGGG" is "5" and the number of hits of the individual search result 43 including "IIII" is "4", "GGGG" has a higher rank than "IIII" according to the rule (3).

Figure 9:
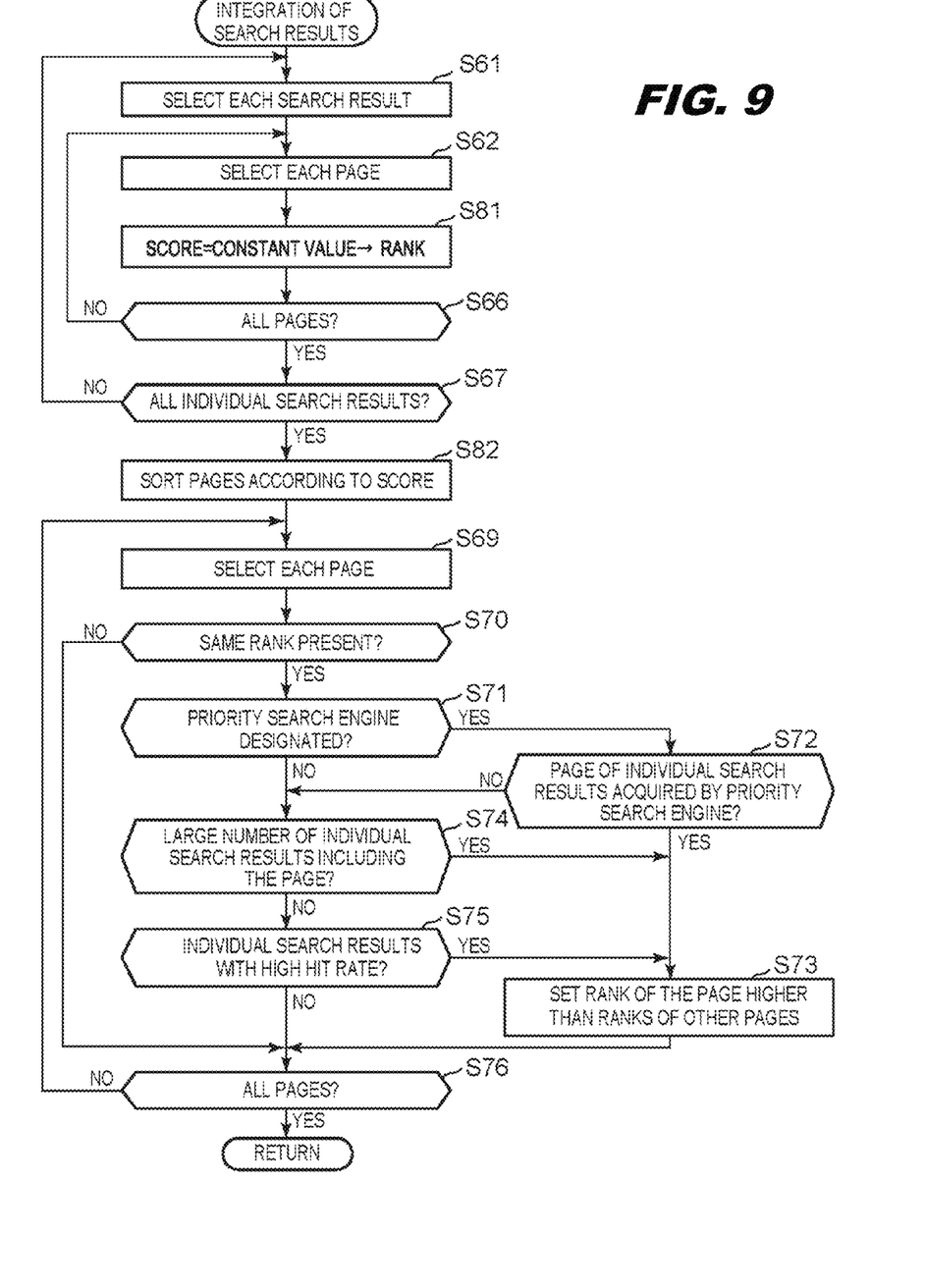
FIG. 9 is a flowchart illustrating another sub routine for search result integration in FIG. 2, according to one exemplary embodiment of principles described herein.

A method shown in FIG. 9 may be used in place of the search result integrating method. According to the method, a score is calculated by the following equation 1 and given to a selected hit page (S81). It is to be noted that all scores are totaled for hit pages included in two or more individual search results.

$$\text{score} = \text{predetermined value (e.g., 200)} - \text{rank of the hit page} \quad (1)$$

Then, the hit pages are sorted according to the given score (S82).

Instead of the method, a method used in the metasearch (see, for example, "Cynthia Dwork, Ravi Kumar, Moni Naor and D. Sivakumar, "Rank aggregation methods for the Web", Proceedings of the 10th international conference on World Wide Web, p 613-622, 2001) may be used.

The present invention generates a plurality of sub queries by combining keywords included in a main query, and separately sends the sub queries to a plurality of search engines, so that necessary information can be efficiently acquired without allowing private information to be surmised from the main query.

Although the foregoing embodiment uses three search engines, the number of search engines is not particularly restrictive. For example, a single search engine may be used and a plurality of sub queries may be separately sent to the same search engine.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A search method, said method comprising:
    accepting user input of a main query including a plurality of keywords;
    accepting user input that identifies at least one combination of said keywords inhibited to be used as a sub-query;
    generating a plurality of sub queries based on the user input each including one or more keywords by combining the keywords included in the input main query;
    excluding sub-queries that are identified as inhibited combinations;
    calculating a co-occurrence probability for the keywords of each sub-query;
    sorting keyword combinations in a descending order based on the co-occurrence probabilities;
    excluding from use as a sub-query any combination of keywords having a co-occurrence probability below a threshold;
    separately sending the generated sub queries to a number of search engines;
    re-searching a plurality of search results returned from the search engine in response to the plurality of sub queries, with the input main query; and
    displaying search results acquired by the re-searching step.

2. The method of claim 1, further comprising searching said keywords in a dictionary and excluding from use as a sub-query any combination of said keywords containing a keyword not found in said dictionary.

3. The method of claim 1, further comprising calculating a co-occurrence probability for the keywords of each sub-query and excluding from use as a sub-query a specific number of keyword combinations having the lowest co-occurrence probability.

4. The method of claim 1, further comprising receiving individual search results from each of said search engines, each individual search result comprising a number of hits matching the sub-query submitted to a corresponding search engine.

5. The method of claim 4, in which said individual search results each comprise a listing of web pages.

6. The method of claim 4, further comprising filtering said individual search results to exclude listings that do not satisfy said search query.

7. The method of claim 6, further comprising integrating said individual search results from said search engines to produce an integrated search result.

8. A search apparatus implemented in a computer, said apparatus comprising a processor programmed to:
receive a search query comprising a plurality of keywords;
determine each mathematical combination of the plurality of keywords;
divide the search query into a number of sub-queries, in which each sub-query comprising at least one of said keywords and in which each mathematical combination is represented as a separate sub-query;
compare each sub-query to an inhibited combinations list;
exclude sub-queries that are identified as inhibited combinations;
after excluding sub-queries that are identified as inhibited combinations, submit remaining sub-queries to different search engines such that private information from the search query is less discernible at any one of said search engines than if more of the keywords of the search query were provided to that individual search engine; and
re-search a plurality of search results returned from the different search engines in response to the submission of said sub-queries, said re-searching being performed using all the keywords of the search query.

9. The search apparatus of claim 8, in which said processor is further programmed to accept user input identifying at least one keyword or combination of said keywords that is not to be used as a sub-query.

10. The search apparatus of claim 8, in which said processor is further programmed to search said keywords in a dictionary and to exclude from use as a sub-query any combination of said keywords containing a keyword not found in said dictionary.

11. The search apparatus of claim 8, in which said processor is further programmed to calculate a co-occurrence probability for the keywords of each sub-query and to exclude from use as a sub-query any combination of keywords having a co-occurrence probability below a threshold, in which the co-occurrence probability is a ratio of percentage chance that multiple keywords will be used in a same search result.

12. The search apparatus of claim 8, in which said processor is further programmed to calculate a co-occurrence probability for the keywords of each sub-query and to exclude from use as a sub-query a specific number of keyword combinations having the lowest co-occurrence probability.

13. The search apparatus of claim 8, in which said processor is further programmed to receive individual search results from each of said search engines, each individual search result comprising a number of hits matching the sub-query submitted to a corresponding search engine.

14. The search apparatus of claim 13, in which said processor is further programmed to filter said individual search results to exclude listings that do not satisfy said search query.

15. The search apparatus of claim 14, in which said processor is further programmed to integrate search results from each of said search engines to produce an integrated search result.

16. A computer program product for protecting information in search queries, the computer program product comprising:
a tangible computer readable storage medium having computer readable program code embodied therewith, the computer readable program code comprising:
computer readable program code configured to receive a search query comprising a plurality of keywords;
computer readable program code configured to determine each mathematical combination of the plurality of keywords;
computer readable program code configured to divide the search query into a number of sub-queries, in which each sub-query comprising at least one, but less than all, of said keywords and in which each mathematical combination is represented as a separate sub-query;
computer readable program code configured to exclude sub-queries identified as inhibited combinations and based on a co-occurrence probability, in which the co-occurrence probability is a ratio of percentage chance that multiple keywords will be used in a same search result;
computer readable program code configured to submit remaining sub-queries to different search engines after said exclusion such that each search engine receives only a sub-query and less than all of said plurality of keywords such that private information from the search query is less discernible at any one of said search engines than if that search engine received more of said plurality of keywords of said search query;
computer readable program code configured to, generate an integrated search results based on a rank of hits returned from the different search engines in response to the submission of said sub-queries, in which hits that share rank are sorted based on a number of rules, in which the number of rules comprise:
a first rule indicating a hit returned from a priority search engine is ranked above a hit from another search engine;
a second rule indicating a hit returned by more search engines is ranked above a hit returned by fewer search engines; and
a third rule indicating a hit returned from a search engine with more total number of hits is ranked above a hit returned from a search engine with fewer total number of hits;
in which the first rule is evaluated before the second rule and in which the second rule is evaluated before the third rule;
computer readable program code configured to search the integrated search results.

17. The computer program product of claim 16, further comprising computer readable code configured to exclude specific keywords or combinations of keywords from use as a sub-query.

18. The computer program product of claim 16, further comprising computer readable code configured to:
filter individual search results to exclude listings that do not satisfy said search query.

19. A method of protecting information in search queries using a search apparatus with a user interface that is configured for connection to a computer network, said network comprising a plurality of search engines on a plurality of servers, said method comprising:

receiving a search query comprising a plurality of keywords;

dividing the search query into a number of sub-queries, each sub-query comprising at least one of said keywords but less than all of said keywords;

comparing each sub-query to an inhibited combinations list that includes a number of keywords from the search query;

excluding sub-queries that are identified as inhibited combinations;

submitting remaining sub-queries to different search engines such that each search engine receives less than all of said plurality of keywords such that private information from the search query is less discernible at any one of said search engines than if that search engine received more of said plurality of keywords of said search query; and generating an integrated search results based on a rank of hits included in individual search results returned from the different search engines in response to the submission of said sub-queries, in which hits that share rank are sorted based on a number of priority rules; and searching the integrated search results.

20. The method of claim 19, further comprising accepting user input that identifies at least one keyword or combination of said keywords that is not to be used as a sub-query.

21. The method of claim 19, further comprising searching said keywords in a dictionary of the language in which said search query is presented and excluding from use as a sub-query any combination of said keywords containing a keyword not found in said dictionary.

22. The method of claim 19, further comprising calculating a co-occurrence probability for the keywords of each sub-query and excluding from use as a sub-query any combination of keywords having a co-occurrence probability below a threshold.

23. The method of claim 19, further comprising calculating a co-occurrence probability for the keywords of each sub-query and excluding from use as a sub-query a specific number of keyword combinations having the lowest co-occurrence probability.

* * * * *